(12) United States Patent
Ueno et al.

(10) Patent No.: US 6,498,675 B2
(45) Date of Patent: Dec. 24, 2002

(54) WAVELENGTH CONVERTER

(75) Inventors: Yoshiyasu Ueno, Tokyo (JP); Kazuhito Tajima, Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 09/781,351

(22) Filed: Feb. 12, 2001

(65) Prior Publication Data

US 2001/0019447 A1 Sep. 6, 2001

Related U.S. Application Data

(62) Division of application No. 09/067,191, filed on Apr. 27, 1998, now Pat. No. 6,282,015.

(30) Foreign Application Priority Data

Apr. 28, 1997 (JP) ............................................. 9-111633

(51) Int. Cl.[7] ............................................. G02F 1/365
(52) U.S. Cl. ....................................... 359/332; 385/122
(58) Field of Search ................................ 359/326–332; 385/122; 372/21–22

(56) References Cited

U.S. PATENT DOCUMENTS

| | | | | |
|---|---|---|---|---|
| 5,022,731 A | * | 6/1991 | Maerfeld et al. | 359/332 |
| 5,064,265 A | * | 11/1991 | Khanarian et al. | 359/332 X |
| 5,224,194 A | * | 6/1993 | Islam | 385/122 |
| 5,771,097 A | * | 6/1998 | Kusunose et al. | 356/520 |
| 6,115,520 A | * | 9/2000 | Laskowski et al. | 385/50 |
| 6,282,015 B1 | * | 8/2001 | Ueno et al. | 359/332 |

FOREIGN PATENT DOCUMENTS

JP         8-334796         * 12/1996

OTHER PUBLICATIONS

K. Tajima et al., "Ultrafast Polarization–Discriminating Mach–Zehnder All–Optical Switch," Appl. Phys. Lett. 67(25):3709–3711, Dec. 18, 1995.

* cited by examiner

Primary Examiner—John D. Lee
(74) Attorney, Agent, or Firm—Dickstein, Shapiro, Morin & Oshinsky, LLP.

(57) ABSTRACT

A wavelength converter which has simple configuration and can be easily controlled and operated with stability, and used for a long-distance mass optical communication, comprises a waveguide for causing a change of a nonlinear refractive index. The converter includes a delay interference circuit having two optical paths and of different optical path lengths. A CW light source is input into the waveguide. A coherent length determined by a spectral line width of CW light output from the CW light source is longer than an optical path difference between the two optical paths in the delay interference circuit.

2 Claims, 5 Drawing Sheets

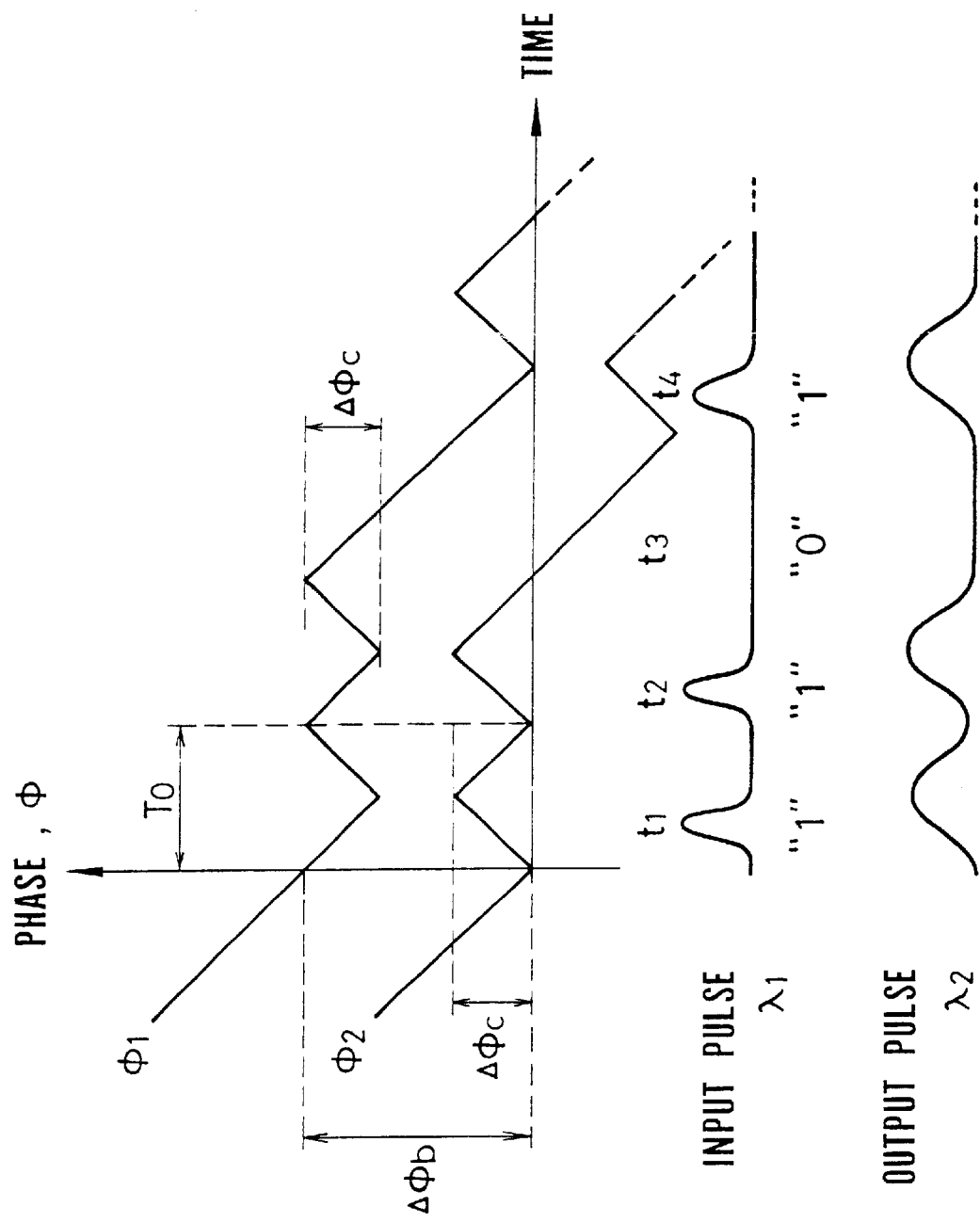

WAVELENGTH CONVERTER

This is a division of application Ser. No. 09/067,191, filed Apr. 27, 1998, (U.S. Pat. No. 6,282,015).

BACKGROUND OF THE INVENTION

1. Field of the Invention

The present invention relates to a wavelength converter for use in a wavelength division multiplex (WDM) optical communication, and more particularly to a wavelength converter for use in high-speed WDM optical communication.

2. Description of the Prior Arts

In recent years, WDM optical communication has begun to be developed as a mass optical communication system. In this WDM optical communication, each wavelength in a signal light whose wavelength is multiplexed is allocated to each communication channel. In order to transmit or receive a signal between channels, it is necessary to convert the wavelength of an original signal string to the wavelength corresponding to the specified channel. Conventionally, this signal wavelength conversion has been performed by converting optical signals once to electric signals and then converting the electric signals to optical signals having a different wavelength again.

On the other hand, recently research has been performed on a device designed to convert wavelengths of optical signals directly without converting them to electric signals. There have been proposed interaction-type devices such as a symmetrical Mach-Zender type device and a polarization-discrimination type device.

The symmetrical Mach Zender type wavelength converter has been conventionally reported as an optical switch ("Applied Physics Letters," by S. Nakamura et al., vol. 65, pp. 2445), which has also a feature of a wavelength converter since it outputs signal pulses having wavelengths different from those of input signal pulses. This symmetrical Mach-Zender type wavelength converter (hereinafter, a wavelength converter of a conventional example 1) has a configuration in which two waveguides 24 and 25 causing changes of nonlinear refractive indices (hereinafter, nonlinear waveguides) are arranged in respective arms of a Mach Zender interferometer as shown in FIG. 1A. If continuous wave (CW) light having a wavelength $\lambda 2$ output from a CW light source 21 is entered from a CW light input port 22, it is branched in a branch section 23 and then each light beam is introduced into the nonlinear waveguide 24 or 25. On the other hand, from a signal input port 26, an original signal of an input signal pulse having a wavelength $\lambda 1$ is entered. The input signal pulse is branched in a branch section 27, and both are is transmitted through an optical path 28 or 29 and introduced to the nonlinear waveguide 24 or 25, so as to change a refractive index of the nonlinear waveguide 24 or 25 for a fixed period of time. Assuming that $\Delta t$ is a delay time generated between input signal pulses transmitted through two optical paths due to an optical path difference between the optical paths 28 and 29, if the pulse width $\Delta T$ of an input signal pulse is sufficiently shorter than $\Delta t$, entering the input signal pulse into the signal input port 26 at time t1, for example, outputs an output signal pulse having a wavelength $\lambda 2$ with the first transition at the time t1 and the last transition at time t1+$\Delta t$. In this manner, the wavelength converter of the conventional example 1 converts the wavelength $\lambda 1$ to the wavelength $\lambda 2$. As a wavelength converter which is the same as the above except that an optical delay section composed of two optical paths 28 and 29 is arranged differently from that in FIG. 1A, there is a converter which is disclosed in Japanese Non-examined Patent Publication No. 7-199240 to Nakamura.

Alternatively a polarization-discrimination type wavelength converter as shown in FIG. 1B (hereinafter, a wavelength converter of a conventional example 2) is also conventionally reported as an optical switch ("Applied Physics Letters," by T. Tajima et al., vol. 67, no. 25, pp. 3709–3711, 1995 and "IEEE Photonics Technology Letters," by N. S. Patel et al., vol. 8, pp. 1695–1697, 1996). This optical switch serves as a wavelength converter like the above-mentioned symmetrical Mach Zender type converter. It differs from the above wavelength converter of the conventional example 1 in that a specifically polarized light component is delayed by $\Delta t$ using a polarization-discrimination delay circuit 43 and then advanced by $\Delta t$ using a polarization-discrimination delay circuit 47 to resume the previous state. After an input signal pulse having a wavelength $\lambda 1$ is entered into the signal input port 45 at time t1 by these actions, it becomes possible to perform a wavelength conversion in which output signal pulses at time t1 to time t1+$\Delta t$ can be output from a signal output port 48 comparable to the wavelength converter of the conventional example 1 by using only a single nonlinear waveguide 44. For example, assuming that the polarization-discrimination delay circuit 43 is used to perform a polarization-discrimination and a delay for an input light of an S polarized light and that the polarization-discrimination delay circuit 47 is used to perform a polarization-discrimination and a delay for an input light of a P polarized light, the operations are as follows: if a CW light having a wavelength $\lambda 2$ is entered from a CW light source 41, the polarization-discrimination delay circuit 43 performs a delay by $\Delta t$ only for S polarized light components of the CW light and then the components are introduced to a nonlinear waveguide 44, while an input signal pulse having a wavelength $\lambda 1$ is entered with a pulse width $\Delta T$ which is efficiently shorter than $\Delta t$ into a signal input port 45 and introduced to the nonlinear waveguide 44 via a combiner section 46 so as to change a refractive index of the nonlinear waveguide 44. When the CW light passes through the nonlinear waveguide 44, only the P polarized light components are given a delay by $\Delta t$, in other words, the S polarized light components are advanced by $\Delta t$, by which the above output signal pulses are output from the signal output port 48.

The above-mentioned wavelength converters of the conventional example 1 and the conventional example 2, however, have problems as described below, respectively.

The wavelength converter of the conventional example 1 has a problem that a configuration is complicated due to two nonlinear waveguides 24 and 25 arranged therein. In addition, it is necessary to control a balance strictly between refractive indices (therefore a phase of a transmitting signal pulse) and changes of the nonlinear refractive indices of the two nonlinear waveguides 24 and 25 each other. If waveguides are operated for a long time using semiconductor materials for the waveguides, for example, the refractive indices of the semiconductor waveguides change little by little. Such a slight change difference between refractive indices of the two nonlinear waveguides significantly deranges operating conditions in the wavelength converter of the conventional example 1, and therefore a long-time continuous change of the refractive indices becomes a significant problem and a precise control circuit is required in order to adjust a difference between the refractive indices of the two nonlinear waveguides each other.

On the other hand, the wavelength converter of the conventional example 2 includes only a single nonlinear waveguide 44, and therefore it has a simple configuration and easy controls in comparison with the conventional example 1. The wavelength converter of the conventional example 2, however, has problems that it is required to arrange elements used for polarization-discrimination in the polarization-discrimination delay circuits 43 and 47 in the configuration and that it is necessary to set an axis of each polarization-discrimination delay circuit according to a polarization status of an input CW light.

SUMMARY OF THE INVENTION

It is an object of the present invention to provide a wavelength converter which has a simple configuration without a need for elements used for polarization-discrimination and does not have any dependency on input CW light polarization.

According to the present invention, there is provided a wavelength converter which comprises a waveguide which causes a change of a nonlinear refractive index, a delay interference circuit having two optical paths of different optical path lengths, and a CW light source, wherein a coherent length ($\Delta L_c = v_g/\Delta v : v_g$ is a traveling speed of the CW light in the delay interference circuit) determined by a spectral line width ($\Delta v$) of CW light output from the CW light source is longer than an optical path difference ($\Delta L_d$) between the two optical paths in the delay interference circuit ($\Delta L_c > \Delta L_d$).

As another aspect of the invention, a wavelength converter further comprises a signal input port for entering an input signal pulse which is an original signal whose wavelength is required to be converted for the waveguide which causes a change of the nonlinear refractive index, wherein the optical path difference $\Delta L_d$ obtain a relation of a formula, $\Delta L_d = v_g T_0/2$ ($T_0$ indicates an interval of the input signal pulses) with the traveling speed. ($v_g$) of the CW light in the delay interaction circuit and the input signal pulse entered into the signal input port.

A primary effect of the wavelength converter according to the present invention having these configurations is to convert a wavelength to another by causing two CW light beams to interfere with each other after being output from the CW light source at different times.

BRIEF DESCRIPTION OF THE DRAWINGS

FIG. 4 is a diagram illustrating an operation of a second embodiment.

DETAILED DESCRIPTION OF THE PREFERRED EMBODIMENTS

The present invention will be described below with reference to FIGS. 2 and 4.

Figure 1A:
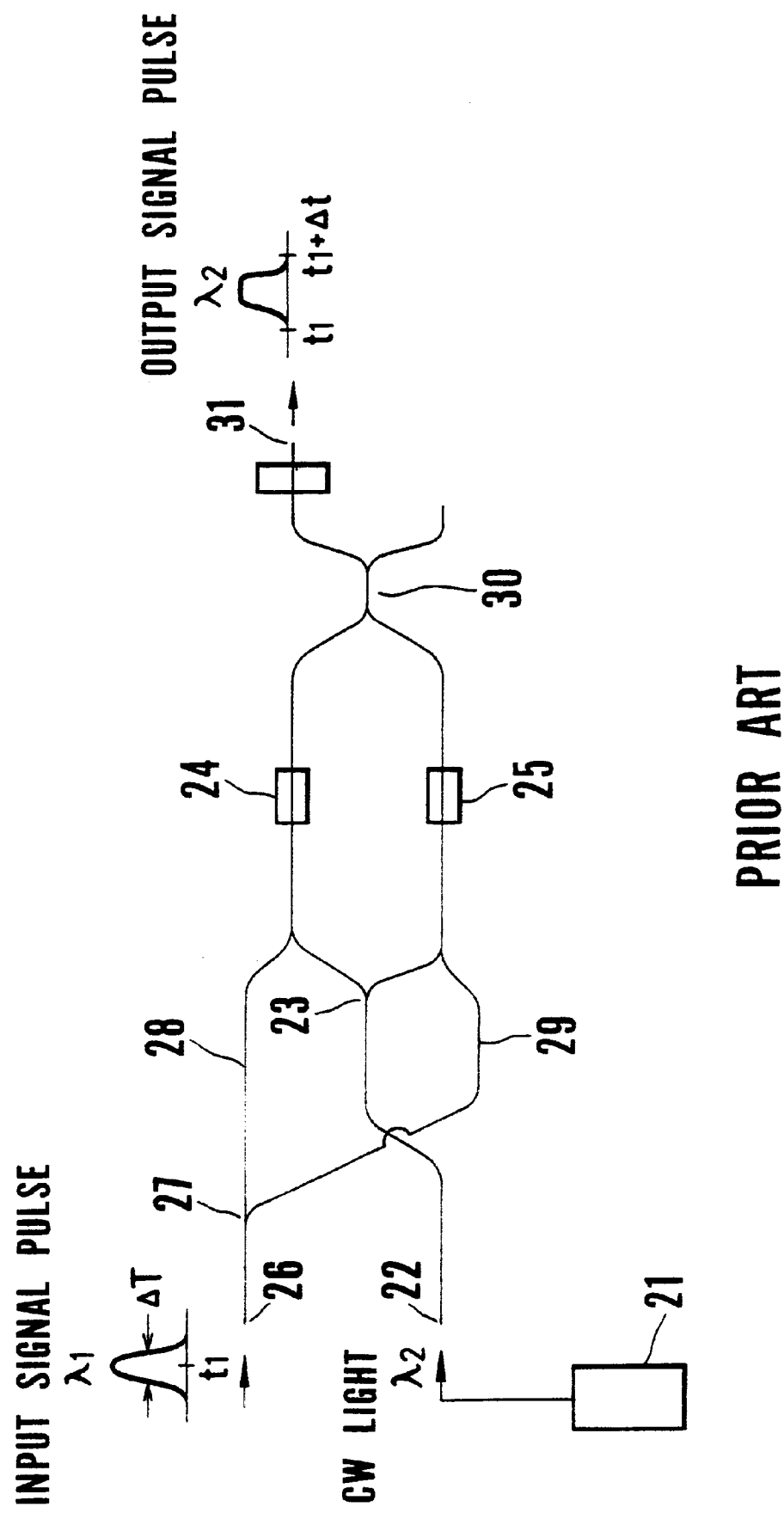
FIG. 1A is a diagram illustrating a configuration of a wavelength converter of a conventional example 1.
Figure 1B:
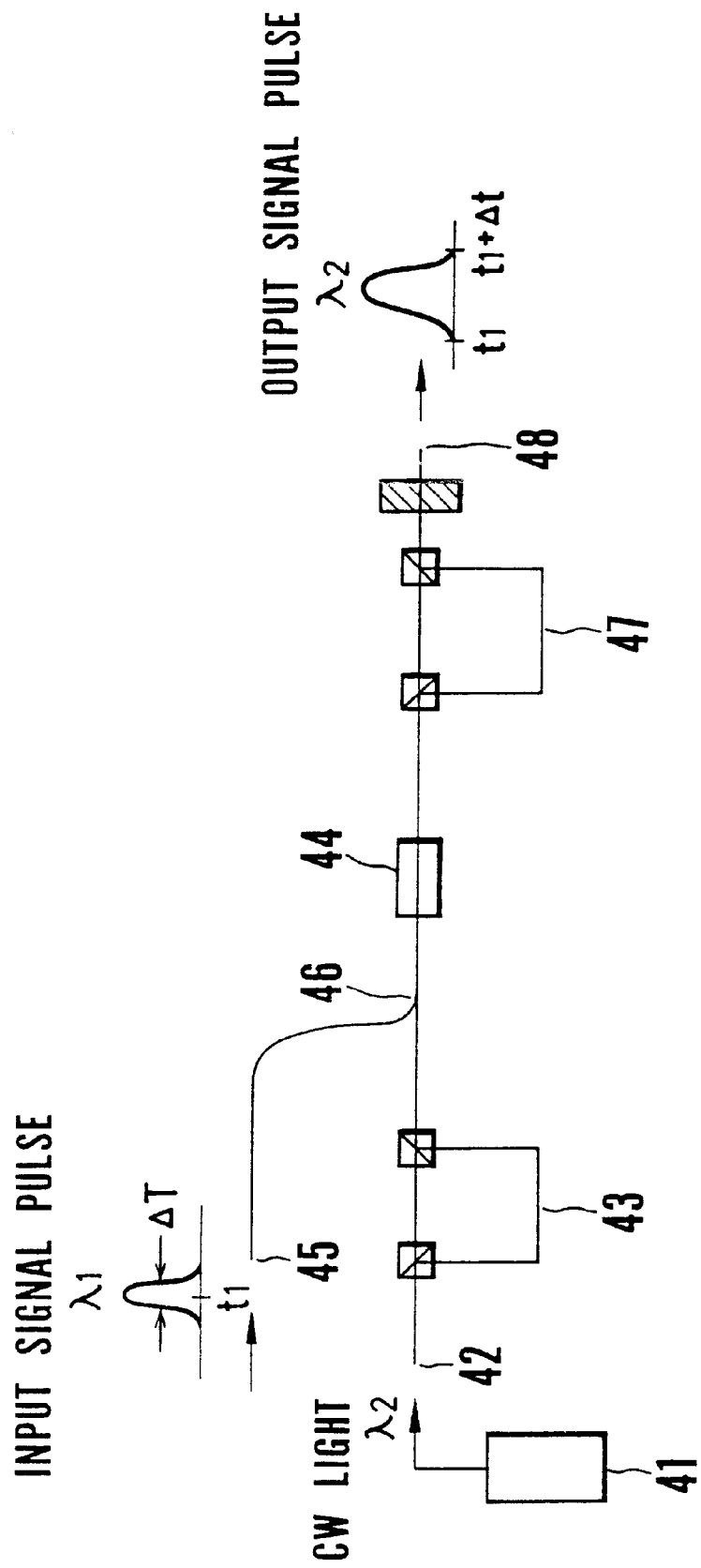
FIG. 1B is a diagram illustrating a configuration of a wavelength converter of a conventional example 2.
Figure 2:
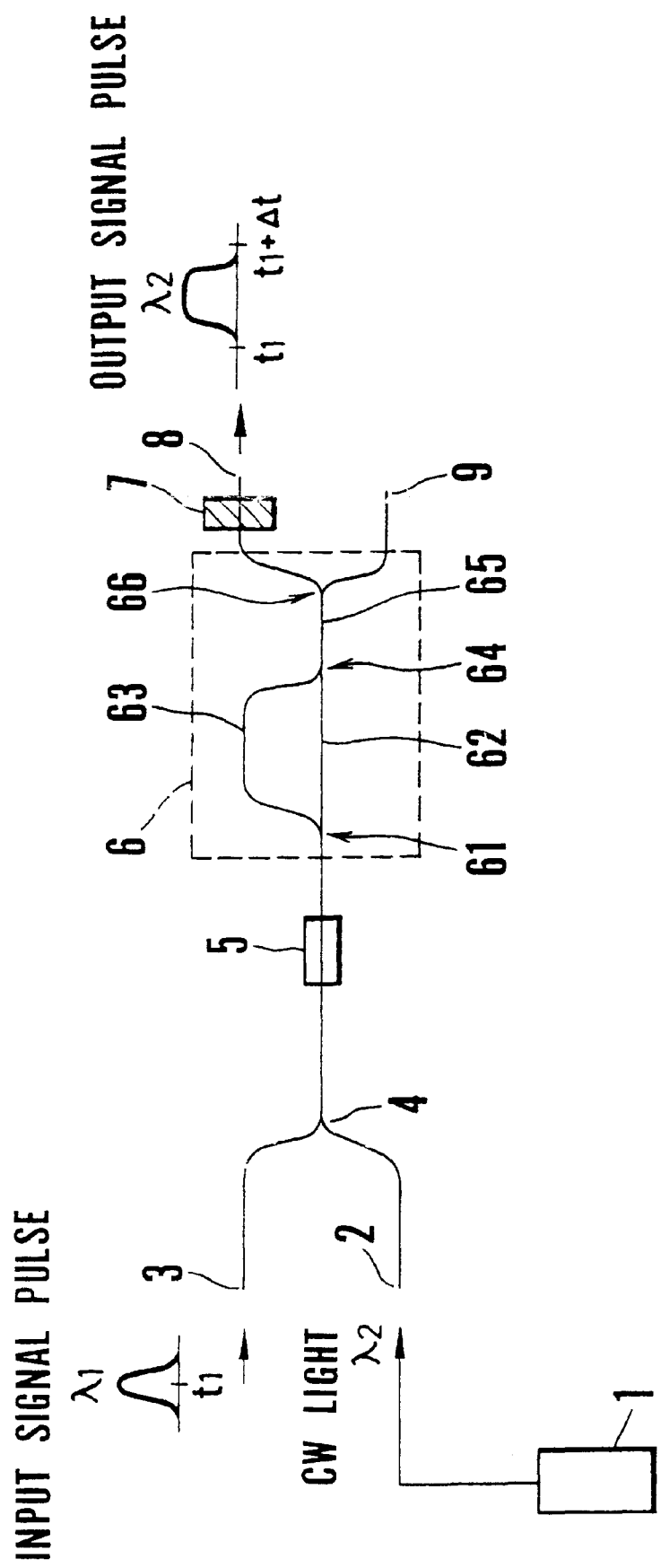
FIG. 2 is a diagram illustrating a configuration of a wavelength converter according to an embodiment of the present invention.

A wavelength converter according to a first embodiment of the present invention has a configuration as shown in FIG. 2. The wavelength converter according to this embodiment is characterized in that it includes only one nonlinear waveguide 5 and no elements for isolation and combination of polarized light.

As shown in FIG. 2, the wavelength converter of this embodiment comprises a CW light source 1 for outputting CW light having a wavelength λ2. A CW light input port 2 enters the CW light output from the CW light source 1. A signal input port 3 receives an input signal pulse having a wavelength λ1. A nonlinear waveguide 5 receives the CW light and the input signal pulse via a branch section 4. A delay interference circuit 6 performs a delay interference for light output from the nonlinear waveguide 5. The wavelength converter further comprises a wavelength filter 7, a signal output port 8 for outputting light whose wavelength has been converted, and an output port 9 for outputting unnecessary light.

The delay interference circuit 6 comprises a branch section 61 for branching input light in the ratio of one to one. A optical path 62 transmits one beam of the light which has been branched in the branch section 61. An optical path 63 transmits the other beam of the light which has been branched in the branch section 61. A combiner section 64 causes the light which has been transmitted through these two optical paths 62 and 63, a delay interaction section 65 for causing light delayed in one of the optical paths due to an optical path difference between the two optical paths 62 and 63 and light transmitted through the other optical path to interfere with each other. A branch section 66 branches light so as to output light including a required output signal pulse to the filter 7 and to output unnecessary light to the output port 9.

As the nonlinear waveguide 5, there is a semiconductor light amplifier in which current is injected or an absorption type semiconductor waveguide in which current is not injected. As an example of a semiconductor heterostructure waveguide which is used as the semiconductor light amplifier or the absorption type semiconductor waveguide, there is a waveguide having a structure in which an $In_{0.63}Ga_{0.37}As_{0.80}P_{0.20}$ bulk active layer having a thickness of 20 to 100 nm or so is sandwiched between InP cladding layers. Instead of the bulk active layer, a quantum well active layer can be used. While $In_{0.63}Ga_{0.37}As_{0.80}P_{0.20}$ is a material composition suitable for amplifying or absorbing a signal in a 1.5 μm wavelength band, another composition of InGaAsP mixed crystal or another mixed crystal semiconductor can be used according to a signal wavelength. The branch section 4 to the nonlinear waveguide 5 can be composed of, for example, a quartz waveguide, a semiconductor waveguide, an optical fiber coupler and the like. In the same manner, the nonlinear waveguide 5 to the signal output port 8 via the delay interference circuit 6 can be composed of a quartz waveguide, a semiconductor waveguide, an optical fiber coupler and the like.

In the wavelength converter of this embodiment having the above configuration, a wavelength is converted to another wavelength as described below.

Figure 3A:
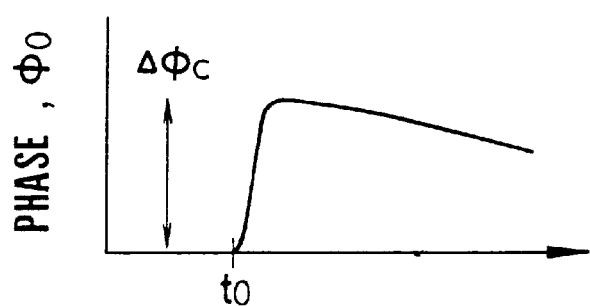
FIGS. 3A, 3B, 3C, and 3D are diagrams illustrating operations of a first embodiment.
Figure 3B:
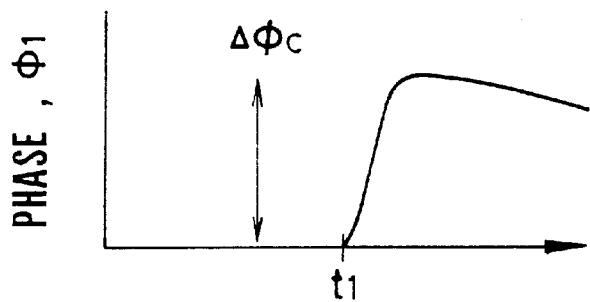
Figure 3C:
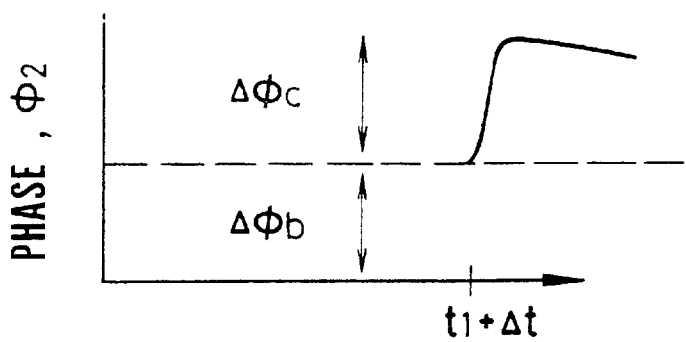

An input signal pulse having a wavelength λ1 which is an original signal whose wavelength is to be converted by the wavelength converter is entered into the signal input port 3 so as to change a carrier density of the nonlinear waveguide 5, by which a refractive index is changed. On the other hand, a CW light having a wavelength λ2 output from the CW light source 1 of a wavelength λ2 is entered into the CW light input port 2, passes through the nonlinear waveguide 5, and then is branched in the ratio of one to one by the branch section 61 of the delay interference circuit 6. In relation to the light which has been branched by the branch section 61, CW light passing through one of the optical paths (arm) 63 is delayed by Δt in comparison with CW light which passes through the other optical path (arm) 62 and afterward they are combined in the combiner section 64. These two CW light beams which have been combined in the combiner section 64 and then interfere with each other in the delay interference section 65 are described below, assuming that a recovery time (ΔT') of a carrier density of the nonlinear waveguide 5 is long enough in comparison with an input signal pulse width (ΔT), for simplification. FIGS. 3A to 3D indicate time transition of phases of the CW light passing through the nonlinear waveguide 5 and the two CW light beams arriving at the combiner section 64. First, a phase ($\Phi_0$) of the CW light passing through the nonlinear waveguide 5 changes by $\Delta\Phi_c$ due to an input signal pulse which arrives at the nonlinear waveguide 5 at time $t_0$, as shown in FIG. 3A. A phase ($\Phi_1$) of the CW light passing through one arm 62 in the delay interaction circuit 6 changes in the same manner as for the one shown in FIG. 3A at time $t_1$ ($=t_0+T^P$) in the combiner section 64, as shown in FIG. 3B, assuming that $T^P$ is a time period required for the CW light to travel from the nonlinear waveguide 5 to the combiner section 64. On the other hand, a phase ($\Phi_2$) of the CW light passing through the other arm 63 in the delay interference circuit 6 is further delayed by $\Delta t = \Delta L_d / v_g$ ($\Delta L_d$: An optical path difference of the delay interaction circuit 6, $v_g$: Speed of the CW light traveling on the delay interaction circuit 6) in comparison with the light passing through the arm 62, as shown in FIG. 3C. Therefore, the two CW light beams to be combined at time $t_1$ in the combiner section 64 have been output from the CW light source 1 at time differed by Δt.

In this embodiment, it is assumed that a spectral line width (Δv) of the CW light source 1 is short enough so that the coherent length $\Delta L_C$ obtains a relation of a formula (1).

$$\Delta L_C = v_g / \Delta v > \Delta L_d \tag{1}$$

Therefore, a formula (2) must be satisfied based on the formula (1).

$$\Delta v < \Delta t^{-1} \tag{2}$$

For example, supposing that a repetitive frequency of an input signal pulse is 40 Gb/s, Δt is equal to 10 ps, $\Delta L_d$ is equal to 1.9 mm, Δv can be smaller than 100 GHz (Δv<100 GHz). If a distributed feed-back (DFB) type semiconductor laser is used as the CW light source 1, Δv is 100 kHz to 10 MHz or so and therefore this relation can be easily satisfied. In the above calculation, $n_g = 1.6$ and $v_g = c/n_g$ are applied for a group velocity refractive index, assuming that a quartz waveguide is used for the delay interference circuit 6. If the above relation is satisfied, two CW light beams generated at different time interfere with each other very well.

Figure 3D:
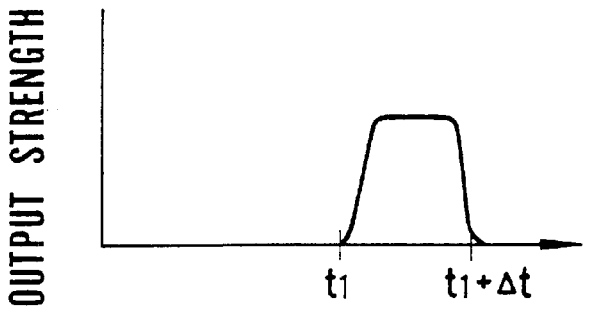

In this manner, an optical signal of an interference light strength shown in FIG. 3D is output from the signal output port 8. In order to erase a signal output at time t<t1 and time t>t1+Δt, it is assumed that a bias phase $\Delta\Phi_b = \pi$. An output signal strength is proportional to $\sin^2 \Delta\Phi_c$.

The wavelength filter 7 is arranged in order to remove input signal pulses. Instead of the wavelength filter, a polarization filter can be used. If an absorption type waveguide is used as the nonlinear waveguide 5, the above filter is unnecessary since input signal pulses are absorbed by the nonlinear waveguide 5.

The output port 9 in FIG. 2 is an output port used for discarding excess CW light. This output port 9 is arranged to prevent excess CW light from reflecting toward the signal input port 3 when CW light is not output to the signal output port 8 due to a balanced interference.

A wavelength converter of a second embodiment of the present invention is the same as the wavelength converter of the first embodiment, except that an optical path difference $\Delta L_d$ is assumed to be equal to $v_g T_0/2$ ($\Delta L_d = v_g T_0/2$) and that different operating conditions are applied to the nonlinear waveguide 5, where $T_0$ is a pulse interval between input signal pulses. FIG. 4 shows phase transition of two CW light beams directly before being combined when four binary signal pulses "1101" are to be entered utilizing a semiconductor light amplifier as the nonlinear waveguide 5. In this embodiment, when using the semiconductor light amplifier as the nonlinear waveguide 5, a time period of decreasing a refractive index caused by an input signal pulse (equivalent to input signal pulse width ΔT) is equalized to an afterward recovery time of a refractive index by current injection (ΔT'). Therefore, a relation of $T=\Delta T'=T_0/2$ is obtained. Under this condition, electric field intensities of the two CW light beams are represented by the following formulas (3) and (4).

$$E_1(t) = \bar{E}_0 \exp(-i\Phi_1) = \bar{E}_0 \exp(-i\Delta\omega_c t + \Phi_b) \tag{3}$$

$$E_2(t) = \bar{E}_0 \exp(-i\Phi_2) = \bar{E}_0 \exp(i\Delta\omega_c t) \tag{4}$$

Accordingly, assuming that a bias phase $\Delta\Phi_b$ is equal to π based on the formulas (3) and (4), an electric field after the interaction is expressed by a formula (5).

$$E_{int} = E_1(t) + E_2(t) = 2\bar{E}_0 \sin(\Delta\omega_c t) \tag{5}$$

As apparent from the formula (5), a signal conversion efficiency is the highest when a phase shift amount ($\Delta\Phi_c = \Delta\omega_c \Delta T$) is equal to π/2. Time transition of an output pulse strength based on the formula (5) is as shown in FIG. 4. In addition, from the formula (5), it is apparent that the wavelength conversion output pulse does not have any wavelength chirping. As an example of the operating condition, an injected current $I_{OP}^{\pi/2}$ required for recovering a π/2 phase shift is 550 mA, assuming that an input pulse energy $P_\pi$ required for π phase shift in an absorption type waveguide is 10 pJ, ΔT is 10 ps (equivalent to a signal pulse repetitive frequency 50 Gb/s based on a repetitive frequency $T_0 = 2\Delta T$), and an optical wavelength is 1.55 μm.

A phase transition in utilizing the absorption type waveguide as the nonlinear waveguide is the same as the transition shown in FIG. 4 except that codes are inverted (the high and low relation of the curve in the diagram is inverted). In this phase transition, a recovery time for a change of a refractive index depends upon a life ($\tau_c$) of an optical excitation carrier in the material of the waveguide, and therefore $\tau_c$ is controlled to satisfy the relation of ΔT=ΔT'. As an example, assuming that ΔT is 1 ps and an average carrier density in a semiconductor active layer is $1 \times 10^{19}$ cm$^{-3}$, a carrier life $\tau_c$ required for ΔT=ΔT' is approximately 340 ps. The life $\tau_c$ is much longer than ΔT, and therefore a change of the refractive index following a change of the carrier density draws an almost linear line as shown in FIG. 4. The carrier life $\tau_c$ can be controlled by application of an electrostatic field, impurity doping, ion injection, low temperature growing, application of an average carrier density and the like. In this embodiment, an electrostatic field of approximately 10 kV/cm, for example, is applied so as to emit carriers (Reference: "Applied Physics Letters", by S. Nakamura et al., vol. 62, no. 9, pp. 925–927, 1993).

As set forth hereinabove, the wavelength converter according to the present invention includes only a single nonlinear waveguide and does not need elements for isolation of polarized light. Therefore, it has a very simple configuration, by which it can be easily manufactured and controlled stably.

The wavelength converter according to the present invention does not have any dependency on light polarization. Therefore CW light and an input signal pulse light polarized in an arbitrary direction can be entered therein. In other words, the invention does not require control of the polarization direction of the CW light and the input signal pulse light.

Furthermore, the wavelength converter according to the present invention can output wavelength conversion signals having no wavelength chirping, and therefore it can contribute to a long-distance transmission which causes less signal distortion.

What is claimed is:

1. A wavelength converter that converts an input signal pulse having a first wavelength into an output pulse having a second wavelength, the wavelength converter comprising:
    a light source which outputs continuous wave ("CW") light;
    a CW light input port which receives the CW light;
    a signal input port which receives the input signal pulse;
    a branch section which combines the CW light and the input signal pulse into a combined light;
    a nonlinear waveguide which transmits the combined light to a delay interference circuit; and
    a signal output port coupled to an output of the delay interference circuit, the signal output port outputting the output pulse;
    wherein the delay interference circuit comprises:
        a combiner section;
        a delay interference section;
        a first branch section which branches the combined light into a first and a second beam of light;
        a first optical path which transmits the first beam of light to the combiner section at a first time interval; and
        a second optical path which transmits the second beam of light to the combiner section at a second time interval which is less than the first time interval; and wherein
        the combiner section combines the first and second beams of light and transmits the first and second beams of light to the delay interference section;
        the delay interference section causes the first beam of light and the second beam of light to interfere with each other thereby producing the output pulse; and a coherent length of the CW light output from the CW light source is longer than an optical path difference between the optical paths in the delay interference circuit.

2. A wavelength converter that converts an input signal pulse having a first wavelength into an output pulse having a second wavelength, the wavelength converter comprising:
    a light source which outputs continuous wave ("CW") light;
    a CW light input port which receives the CW light;
    a signal input port which receives the input signal pulse;
    a branch section which combines the CW light and the input signal pulse into a combined light;
    a nonlinear waveguide which transmits the combined light to a delay interference circuit; and
    a signal output port, coupled to an output of the delay interference circuit, the signal output port outputting the output pulse;
    wherein the delay interference circuit comprises:
        a combiner section;
        a delay interference section;
        a first branch section which branches the combined light into a first and a second beam of light;
        a first optical path which transmits the first beam of light to the combiner section at a first time interval; and
        a second optical path which transmits the second beam of light to the combiner section at a second time interval which is less than the first time interval;
    a second branch section coupled to the delay interference section, the second branch section outputs light from the output signal having a desired output signal pulse, to a wavelength filter and outputs unnecessary light from the output signal to another output port; and wherein
    the combiner section combines the first and second beams of light and transmits the first and second beams of light to the delay interference section; and
    the delay interference section causes the first beam of light and the second beam of light to interfere with each other thereby producing the output pulse.

* * * * *